United States Patent [19]

Mizuno et al.

[11] Patent Number: 4,815,011
[45] Date of Patent: Mar. 21, 1989

[54] ROBOT CONTROL APPARATUS

[75] Inventors: Tohru Mizuno; Haruyuki Ishikawa, both of Tokyo, Japan

[73] Assignee: Fanuc Ltd., Yamanashi, Japan

[21] Appl. No.: 103,579

[22] PCT Filed: Jan. 26, 1987

[86] PCT No.: PCT/JP87/00048
§ 371 Date: Aug. 24, 1987
§ 102(e) Date: Aug. 24, 1987

[87] PCT Pub. No.: WO87/04536
PCT Pub. Date: Jul. 30, 1987

[30] Foreign Application Priority Data

Jan. 25, 1986 [JP] Japan ................................ 61-12983

[51] Int. Cl.$^4$ ........................... G05B 19/39; B25J 9/16
[52] U.S. Cl. ................................... 364/513; 364/188; 364/191; 901/1; 901/3
[58] Field of Search ............... 364/513, 191, 188, 167; 901/1, 3

[56] References Cited

U.S. PATENT DOCUMENTS

| 4,396,977 | 8/1983 | Slater et al. | 364/188 |
| 4,451,895 | 5/1984 | Sliwkowski | 364/188 |
| 4,479,197 | 10/1984 | Haag et al. | 364/188 |
| 4,490,781 | 12/1984 | Kishi et al. | 364/191 |
| 4,519,026 | 5/1985 | Nozawa et al. | 364/167 |
| 4,663,705 | 5/1987 | Kishi et al. | 364/191 |

Primary Examiner—Jerry Smith
Assistant Examiner—Paul Gordon
Attorney, Agent, or Firm—Armstrong, Nikaido, Marmelstein & Kubovcik

[57] ABSTRACT

A robot control apparatus which controls a robot by a program language and which has keys and a display which displays at least one block of data, cyclically selects the word to be changed, in the one block of data is displayed, to be compiled with the desired block and stores the data in that compiled form, so that syntax errors are avoided and it is possible to compile a desired block easily and in a short time.

12 Claims, 10 Drawing Sheets

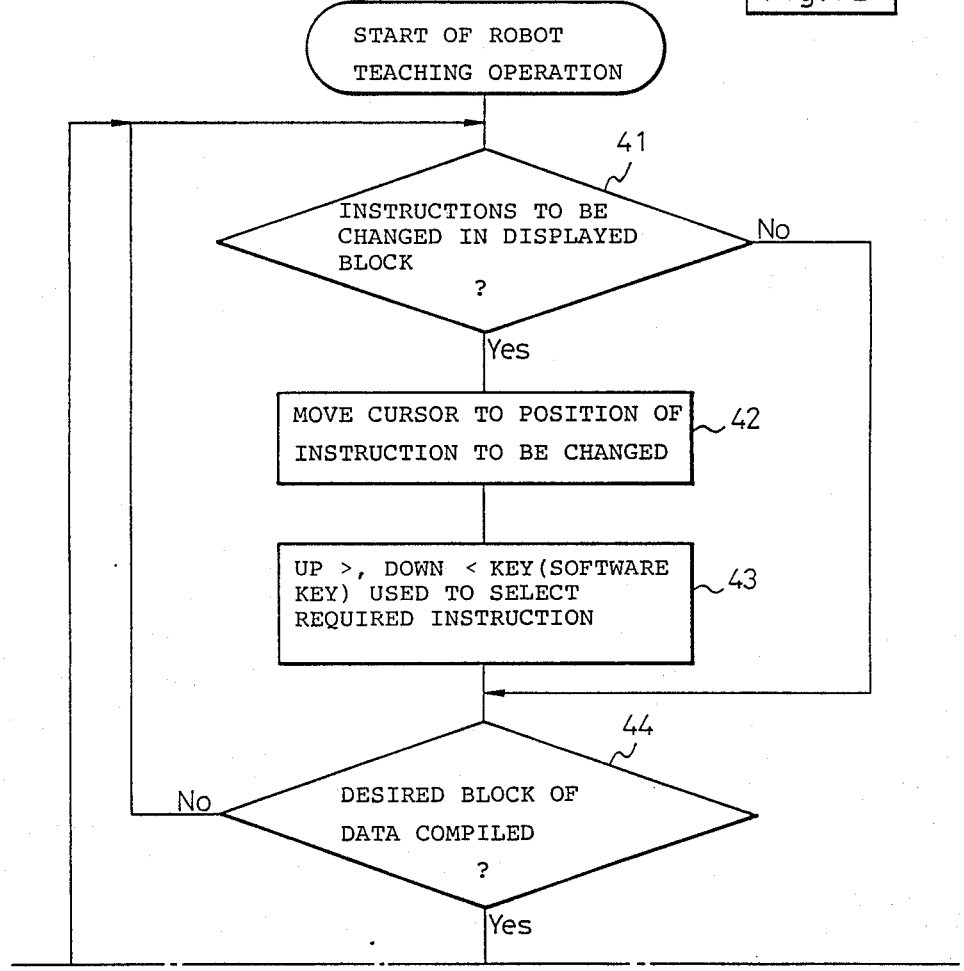

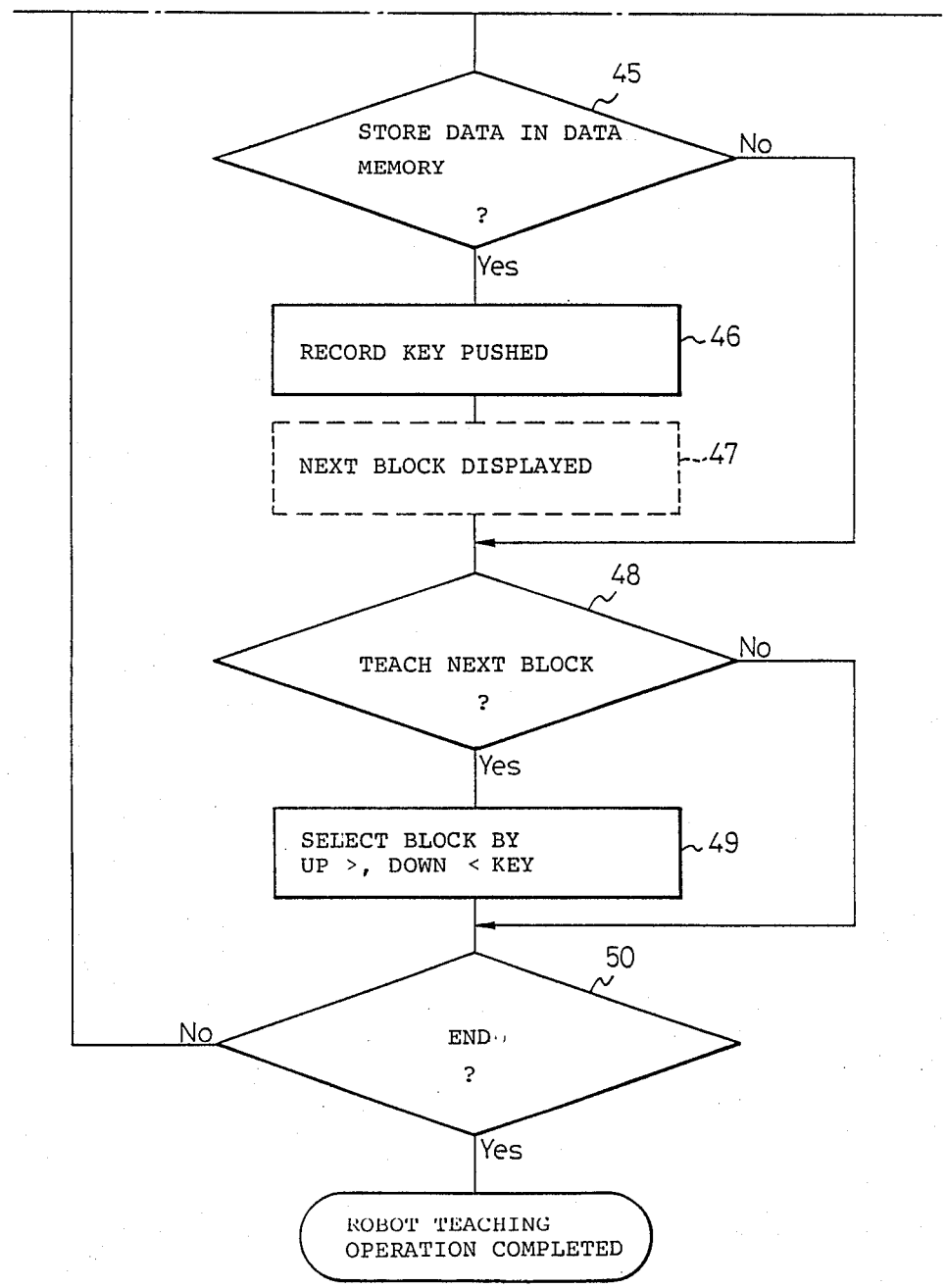

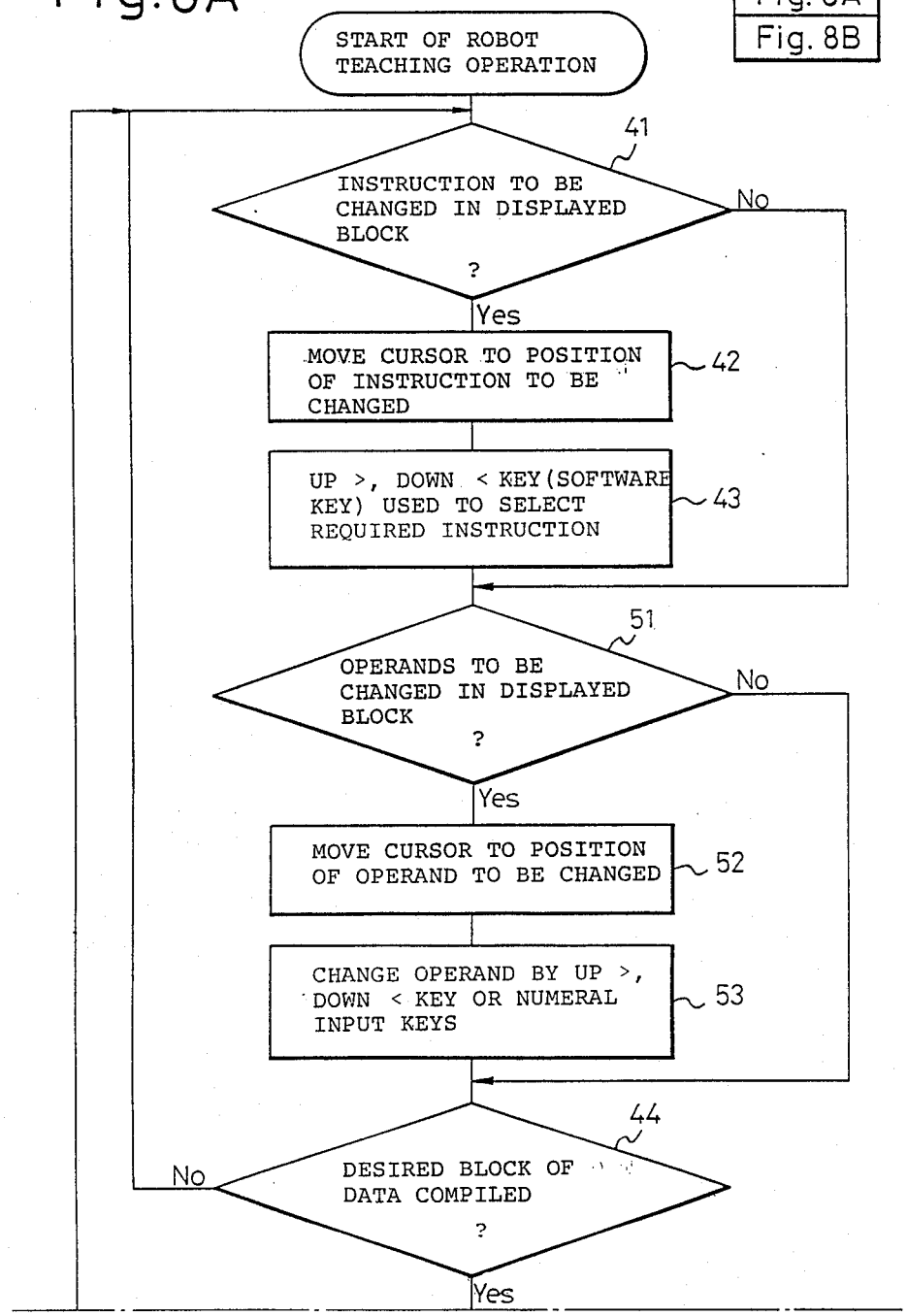

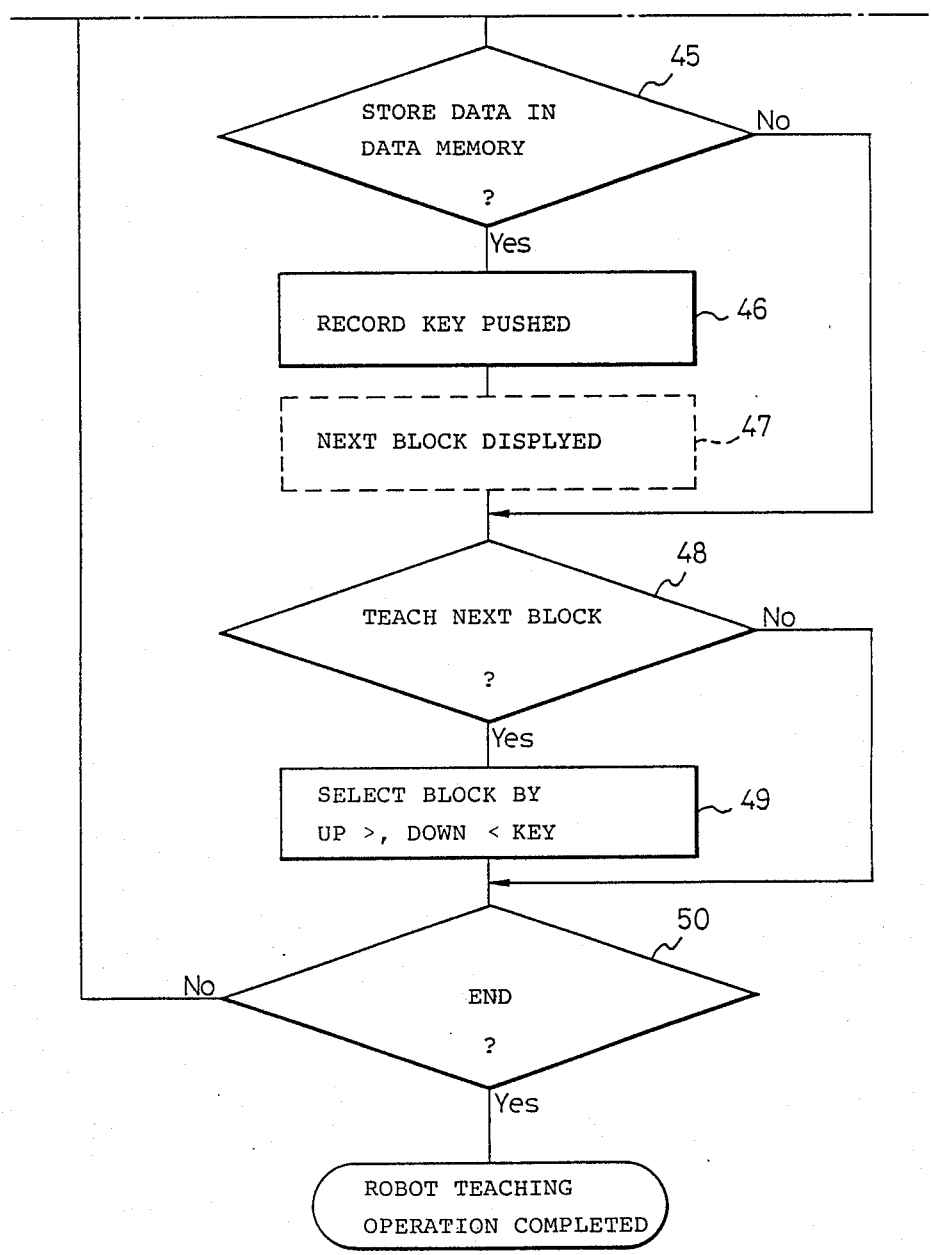

ROBOT CONTROL APPARATUS

DESCRIPTION

1. Technical Field

The present invention relates to a robot control apparatus for controlling a robot by a program language, more particularly, to a robot control apparatus for teaching the type of motion of the robot, the speed of the motion, and positional data, etc., needed to make the robot perform a certain operation.

2. Background Art

Conventional robot control apparatuses generally teach the type of motion, the speed of motion, and positional data of robots using known GS codes.

The system of GS codes lies between a high level language and a machine language and designates the type of motion by a combination of one letter of the alphabet and numerals. Concretely, a G code expresses the type of motion. For example, G00 is the code for moving the front portion of an industrial robot in the shortest possible time without path control of the tool center point (TCP), G01 is the code for moving the TCP in a straight line, and G02 is the code for moving the TCP in an arc. Further, F indicates the speed of motion, P indicates, the positional data, and S is an auxiliary code for signal reception, etc.

Of course, the GS code includes more data than that mentioned above. The GS codes are stored in the data memory for each code through a direct input of the letter of the alphabet and numerals from a keyboard of the robot control apparatus.

Recently, use has been made of robot languages corresponding to PASCAL, FORTRAN, and other high level languages for robot control apparatuses for controlling industrial robots, etc., in order to teach the type of motion, etc.

As mentioned above, conventional robot control apparatuses use GS codes for teaching the type of motion of the robot, so users making actual use of robots must learn the GS codes. However, since GS codes are combinations of single letters of the alphabet with numerals, they are not easily learned. In particular, users with little experience often make mistakes when inputting these codes.

Further, since conventional robot control apparatuses using GS codes must store the codes individually in the data memory, time and effort are required for the preparation and editing of programs by GS codes.

Further, robot control apparatuses using robot languages for teaching the type of motion, etc., have the advantage of enabling a certain extent of understanding of the meaning of each word of the language from the word itself, but general high level languages include numerous types of instructions and are strict with regard to grammar, so the frequency of mistakes in grammar (syntax errors) is increased, requiring time for correction and thus increasing the burden on the user.

3. Disclosure of Invention

The object of the present invention, in consideration of the above-mentioned conventional robot control apparatuses, is to provide a robot control apparatus enabling users to compile a desired block simply and in a short time.

FIG. 1 is a block diagram showing the constitution of a robot control apparatus in accordance with the present invention. According to the present invention, there is provided a robot control apparatus which controls a robot by a program language and which has keys and a display displaying at least one block of data, characterized in that said robot control apparatus comprises: a means 3 for moving a cursor to a position for selection of a word to be changed among words displayed on said display; a means 4 for cyclically selecting a word which is required at said selection position by said keys; and a means 5 for storing a desired one block of data by said selected word when said data is compiled and stored in said compiled form.

The robot control apparatus of the present invention, having the above constitution, uses a program language enabling a user to understand to a certain extent of the meaning of each word of the language, instead of GS codes based on combinations of single letters of the alphabet and numerals, selects cyclically the necessary word by keys while confirming the same by a display unit of said robot control apparatus to compile one block of data, and stores the one block of data as it is in a data memory.

BRIEF DESCRIPTION OF DRAWINGS

FIGS. 7A and B is a flow chart showing an example of a control operation based on the present invention; and FIGS. 8A and B is a flow chart showing another example of a control operation based on the present invention.

BEST MODE FOR CARRYING OUT THE INVENTION

Figure 1:
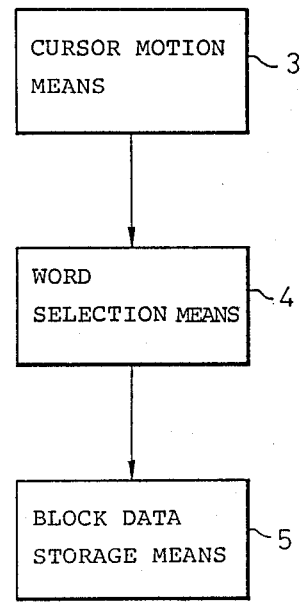
FIG. 1 is a bloc diagram showing the construction of a robot control apparatus according to the present invention.
Figure 2:
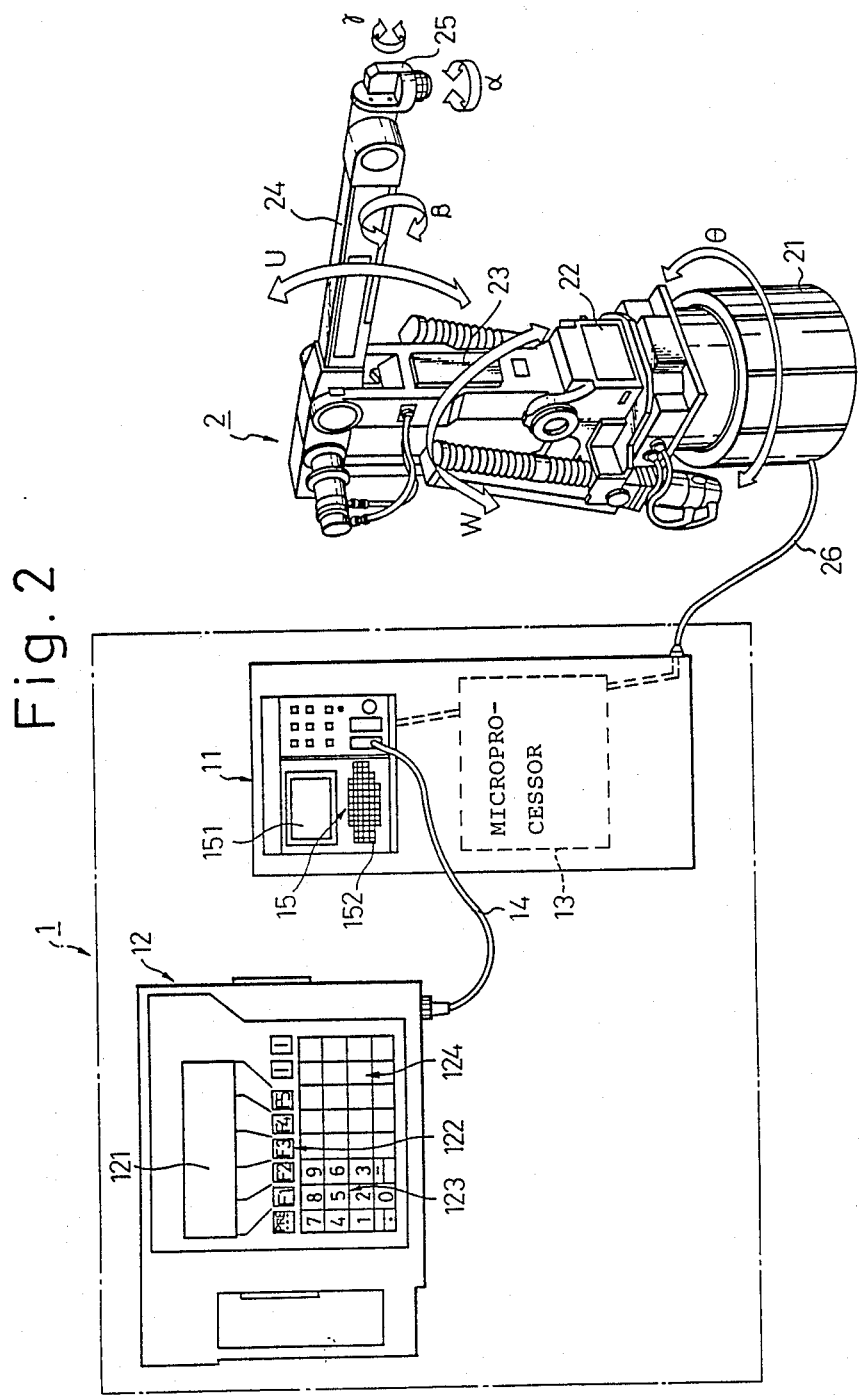
FIG. 2 is a view showing generally any example of a robot control apparatus of the present invention and an industrial robot.

First, an example of the robot control apparatus of the present invention and an industrial robot will be explained in general with reference to FIG. 2. In FIG. 2, 1 is a robot control apparatus and 2 is an industrial robot.

The industrial robot 2 is installed on the floor of a manufacturing plant, etc., and has a body 22, which is rotatable in the direction $\theta$, mounted on a base 21. The body 22 has pivotedly attached thereto a first arm 23 which is rotatable in the direction W. Further, the first arm 23 has pivotedly attached thereto a second arm 24 which is rotatable in the direction U. The second arm 24 has mounted on an end thereof a wrist 25, which is made to be rotatable in the direction $\alpha$, direction $\beta$, and direction $\gamma$. The wrist 25 has mounted on the end thereof, in accordance with the purpose of use thereof in the manufacturing plant, etc., where the industrial robot 2 is installed, a hand, a drill, a terminal unit of a welding apparatus, etc. (not shown).

These moving parts of the industrial robot 2 are rotated by respective drive motors, etc. These drive motors, etc. are connected via a connection cable 26 to the robot control apparatus 1 and controlled by instructions from said robot control apparatus.

The robot control apparatus 1 has a box unit 11 and a teach pendant 12, said teach pendant 12 being connected by a connection calbe 14 to said box unit 11.

The box unit 11 has mounted therein a microprocessor 13, which controls the operation of said industrial robot 2 in accordance with a program input from the teach pendant 12 or an input panel 15.

The teach pendant 12 is provided with a display 121, software keys (function keys) 122, ten-keys (numeral input keys) 123, and keys 124 for moving the robot with respect to the various axes or moving the cursor in the display 121, etc. These keys are used to teach the type of motion, etc. to said industrial robot 2.

Note, the input panel 15 is provided with a display 151 and keyboard 152, etc., but this input panel 15 is not always required.

Figure 3:
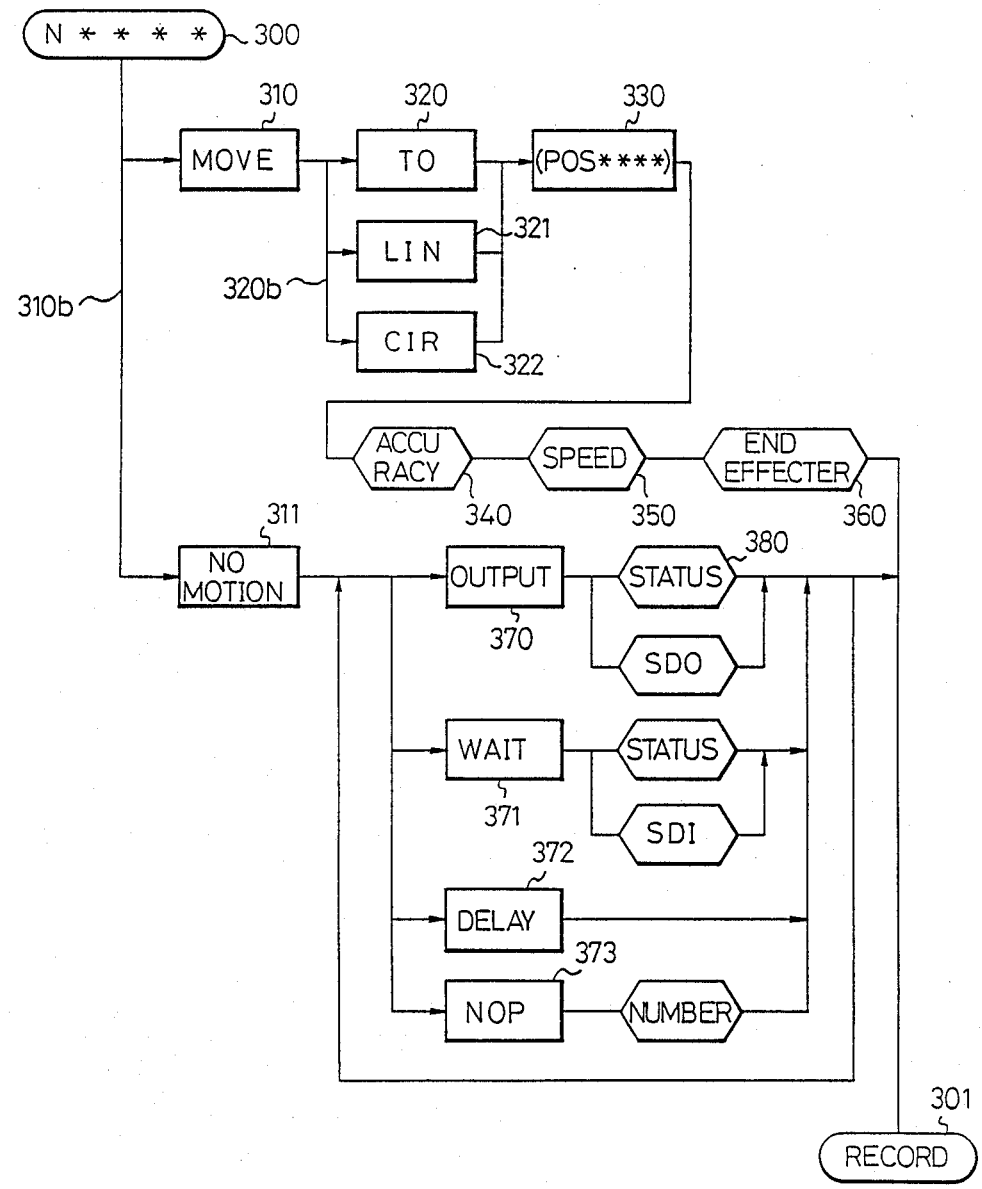
FIG. 3 is a view showing a syntax tree indicating in general the structure of the program language used in the example of the robot control apparatus of the present invention.

FIG. 3 is a view showing a syntax tree which indicates in general the structure of the program language used in the example of the robot control apparatus of the present invention.

The program language shown by the syntax tree of FIG. 3 lies between a high level language and a machine language in terms of languages, and is sufficient for teaching the of motion, etc., to an industrial robot. Specifically, for example, the instruction MOVE 310 corresponds to G in a GS code. As the motion type instruction following this MOVE 310, selection may be made of TO 320, LINEAR (LIN) 321, and CIRCULAR (CIR) 322 at the node 320b of the syntax tree. MOVE TO (310, 320) corresponds to the conventional GS code G00, MOVE LINEAR (310, 321) to G01, and MOVE CIRCULAR (310, 322) to G02.

In this way, theprogram language is expressed in a form enabling the meaning of each word of the language to be directly understood to a certain extent, thus enabling users to memorize and check the meaning of the word more easily and accurately than with the combination of letters of the alphabet and numerals of the conventional GS codes. It is not necessary for the program language expressed in English, and it can be expressed in a language easily understood by the user, for example, Japanese.

Concerning the structure of the above-mentioned language, usually used instructions, etc., are prepared in advance at their respective positions in a block. As mentioned later, users select cyclically the required instructions, etc., at their predetermined positions in a block (respective node positions on syntax tree) to compile the desired one block of data.

In FIG. 3, position (POS * * * *) 330 is used to express the positional data of said industrial robot in the θ, W, U, α, β, and γ directions. The positional data is obtained by actually moving the wrist 25 of the industrial robot 2 and directly storing the position.

ACCURACY 340, SPEED 350, END EFFECTOR 360, etc., may be considered conditions of the instruction MOVE 310. Concretely, at this portion of the condition ACCURACY 340, which indicates the accuracy of stopping, FINE, COURSE, NO SETTLE, NO DECEL, etc., (not shown) may be cyclically selected.

When the instruction NO MOTION 311, which prohibit motion, is selected at the node 310b of the syntax tree instead of MOVE 310, from that node 310b on, for example, OUTPUT 370 and STATUS 380 are simultaneously selected. STATUS 380, which may be considered a condition of the instruction NO MOTION 380, has 1 to 16 operands prepared therein in advance. As mentioned later, the users can cyclinally, or with the ten-keys, directly change the necessary operands of the 1 to 16 operands.

The instruction RECORD 301, for storing data in the memory, is for storing a block in the data memory when a desired block is compiled at block number (N * * * *) 300.

Figure 4:
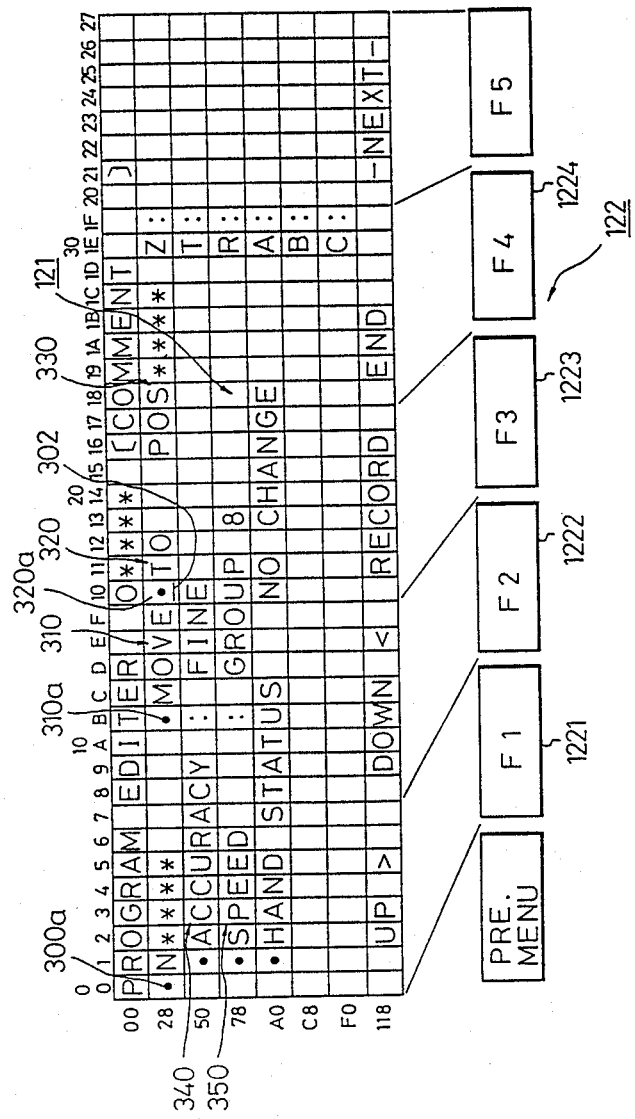
FIG. 4 is a view showing an example of the content displayed on the display of the robot control apparatus of the present invention.
Figure 5:
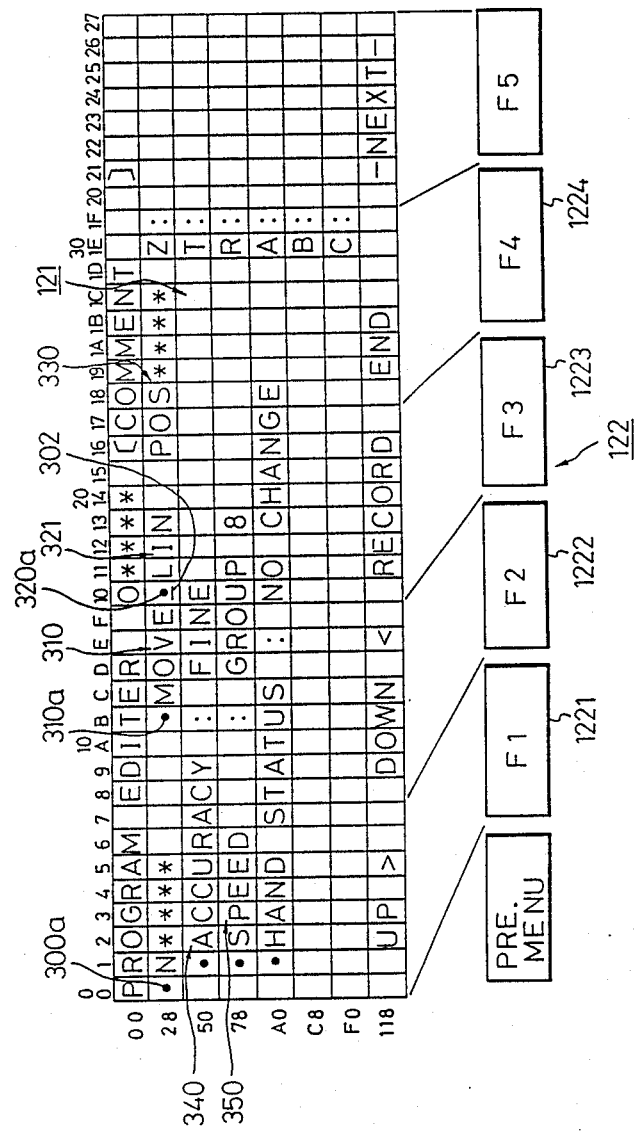
FIG. 5 is a view showing another example of the content displayed on the display of the robot control apparatus of the present invention.

FIG. 4 shows one block in the case of passing through MOVE 310, TO 320, POSITION (POS * * * *) 330, ACCURACY 340, SPEED 350, and END EFFECTOR (in this case, the state of the hand) 360 in the syntax tree of the program language shown in FIG. 3, and FIG. 5 shows one block in the case of selecting LINEAR 321 at the node 320a of the syntax tree instead of TO 320 of FIG. 4.

Next, a detailed explanation will be made of the operation of the robot control apparatus of the present invention with reference to FIG. 3 to FIG. 5.

FIG. 4 and FIG. 5 are views showing the contents of the display 121. As mentioned earlier, for example, three types of motion type instructions TO 320, LINEAR 321, and CIRCULAR 322 are prepared in advance at the selection position 320a (position corresponding to the node 320b of the syntax tree) after the instruction MOVE 310. A cyclic selection of three types of motion type instructions prepared in advance is made by operation of the up software key (UP >) 1221 or the down software key (DOWN <) 1222 shown in FIG. 4 (and FIG. 5).

For example, when desiring to change the motion type instruction TO 320 in FIG. 4 to LINEAR 321, first the cursor is moved to the selective position 320a of the instruction TO 320 to be changed, then the up software key 1221 or the down software key 1222 is operated to select the required motion type instruction LINEAR 321. This selection can be performed cyclically by the above-mentioned software keys. In actual operation, the down software key 1222 is pushed once or the up software key 1221 is pushed twice to change the motion type instruction TO 320 to LINEAR 321, as shown in FIG. 5.

As a more concrete explanation of the cyclic selection of instructions (languages), the motion type instruction TO 320 is changed to LINEAR 321 by a depression of the down software key 1222. If the down software key 1222 is pushed one more, the instruction is changed to CIRCULAR 322. Further, if the down software key 1222 is pushed once more again, the instruction returns to TO 320. The same applies to the operation of the up software key 1221. By pressing the up software key 1221 once, twice, and three times, the motion type instruction TO 320 is changed to LINEAR 321, CIRCULAR 322, and TO 320 cylically. The above operations are, of course, performed with the cursor 302 at the selection position 320a.

Similarly, for example, when changing the instruction MOVE 310 to the instruction NO MOTION 311, the cursor 302 is moved to the selection position 310a of the instruction for motion (position corresponding to node 310b) in the syntax tree) and the up software key 1221 or the down software key 1222 once depressed.

Figure 6:
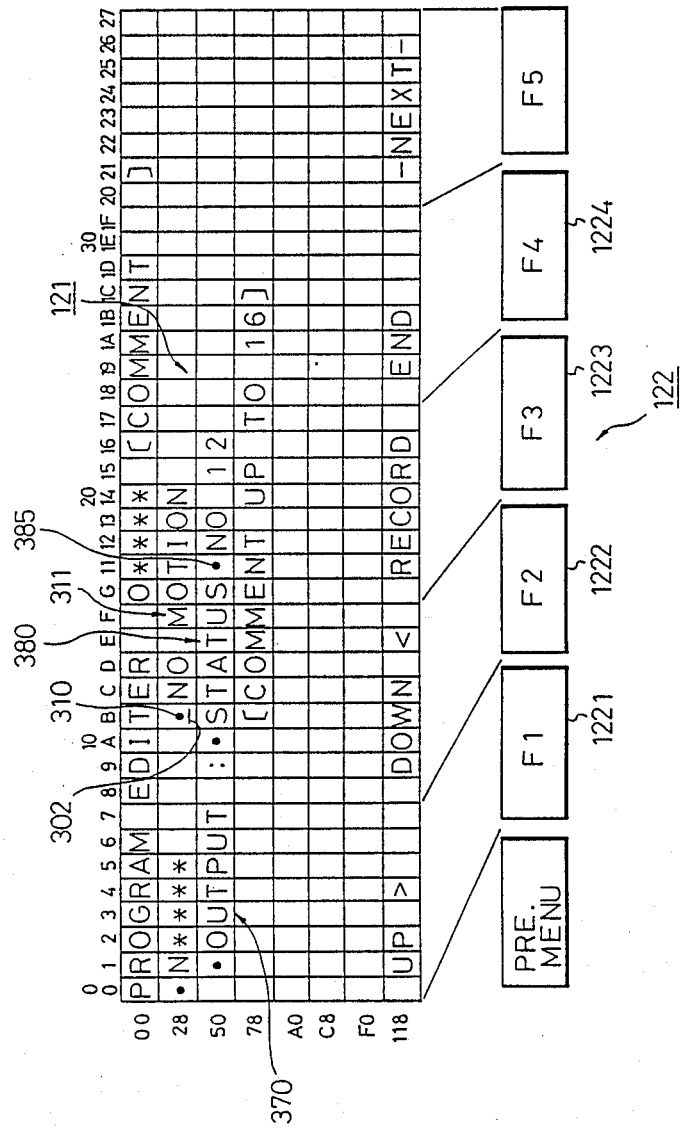
FIG. 6 is a view showing still another example of the content displayed on the display of the robot control apparatus of the present invention.

FIG. 6 shows one block of data indicated on the display 121 in the case of selecting the instruction NO MOTION 311 at the selection position 310a of the language regarding said motion, as mentioned above, and simultaneous changing to OUTPUT 370 and STATUS 380.

In this way, when the cursor 302 is moved to the selection position 310a to select the instruction NO MOTION 311, at the same time, OUTPUT 370 and STATUS 380 are also changed. OUTPUT 370 and STATUS 380 are the words used when the instruction NO MOTION 311 is previously selected. That is, the word previously selected at the nodes is stored as a flow of one block.

When, for example, the instruction NO MOTION 311 is selected, OUTPUT 370, WAIT 371, DELAY 372, or NOP 373, which was selected by the operation previous to the prior operation is preferentially indicated. This preferentially indication is displayed first by the highest frequency of the selection operation, or just before the selection operation.

When the required word is selected at a node position of the afore-mentioned syntax tree, the indication from that node on changes simultaneously and the word selected by the operation previous to the prior operation, for example, is preferentially displayed for the minimum change of the word at the node positions.

The above-mentioned selection of the instructions by the software keys corresponds to a selectio from among instructions prepared in advance for various instructions, but the instructions prepared in advance are instructions which are considered usually used. In the case of an industrial robot, it is necessary to prepare instructions to an extent corresponding to the conventional GS codes.

Further, when it is necessary to change the operands of a word having operands in the one block of data, concretely, when selecting 12 out of the operands 1 to 16 of the STATUS 380 in FIG. 6, first the cursor 302 is moved to the operand change positions 385a and then the change is made to the required operand. This change of the operand, in the same way as the selection of the afore-mentioned word, may be made by the up software key 1221 or the down software key 1222, but it is also possible to form a structure whereby the change to the numerals of the required operand can be made by direct input from the ten-keys 123.

Further, the word selection position or the operand change position is not limited to that directly before the word or operand requiring change and way, for example, the position of the word or operand requiring a change itself or another suitable position.

In the above, in FIG. 4, the ACCURACY 340 and SPEED 350 are displayed as are, but the display is include to improve the understanding of the user and the ease of operation, so of course, the display can be changed in various ways.

Here, Z, T, R, A, B, and C of POSITION 330 are positional data of the wrist 25 of the industrial robot 2 for the directions of the industrial robot $\theta$, W, U, $\alpha$, $\beta$, and $\gamma$. As mentioned before, the positional data is obtained by actually moving the wrist 25 of the industrial robot to the work position, which position is displayed as is.

Further, block number (N * * * *) 300 indicates the address number of the blocks. When the blocks are compile, the content of the first displayed block may be any combination of instruction and operands, etc., but preferably, if the most frequently used block is displayed, it is possible to reduce the number of instructions or operands, etc., to be changed by that amount.

When the required instructions or operands, etc., are selected and the desired block compile, RECORD key 1223 is operated to store the block in the data memory.

The END key 1224 is used when the teaching operation for the industrial robot is completed. Further, the cursor 302 is made to move successively through the instruction selection positions or operand change positions by the cursor key, which is among the keys 124 of the teach pendant 12.

Next, an explanation will be given of the control operation based on the present invention with reference to FIG. 7 and FIG. 8.

FIG. 7 is a flow chart showing an example of a control operation based on the present invention.

In the robot teaching operation, first, at step 41, it is determined if there are instructions (language) to be changed in the one block of data displayed on the display 121. If there ae no instructions to be changed, the displayed block is satisfactory and the routine proceeds to step 44. If there are instructions to be changed, the routine proceeds to step 42. At step 42, the cursor 302 is moved to the position of the instruction to be changed and the routine proceeds to step 43. At step 43, the up software key (UP >) 1221 or the down software key (DOWN <) 1222 is used to select the required instruction from among the previously prepared instructions and the routine proceeds to step 44.

At step 44, it is determined if the desired one block of data has been compiled. If the one block of data has not been compiled, the routine returns to step 41. If the desired one block of data has been compiled, the routine proceeds to step 45. At step 45, it is determined if the one block of data is to be stored in the data memory. When storing, at step 46, the RECORD key 1223 is pushed to store the one block of data in the data memory. Further, at step 45, if there is no need for said one block of data to be stored, the routine proceeds to step 48. The above constitutes one block of a teaching operation.

At step 47, following steps 46, the next block after the above certain block address is automatically displayed, but this is not always necessary. As the above step 48, it is determined whether or not another block should be taught. If there is no need to teach another block, the routine proceeds to step 50. If another block should be taught, the routine proceeds to step 49, a predetermined block address number is selected by the up software key 1221 or the down software key 1222, and the routine proceeds to step 50.

At step 50, it is determined whther or not to the teaching operation is completed. If not completed, that is, if the teaching operation is to be continued, the routine returns to step 41. If otherwise, the robot teaching operation is then completed.

FIG. 8 is a flow chart showing another example of a control operation based on the present invention. This comes between step 43 and step 44 of the flow chart shown in FIG. 7 steps 51, 52 and 53. Steps 41 to 50 are same as previously explained, so the explanation below will be only of steps 51 to 53.

The flow chart in FIG. 8 also shows the processing in the case where the instruction has operands.

In step 51, it is determined whether the operands in the one block of data displayed on the display 121 are to be changed. If there are no instructions to be changed, the displayed block is accepted as is and the routine proceeds to step 44. If an operand is to be changed, at step 52, the cursor 302 is moved to the position of the operand to be changed and routine proceeds to step 53. At step 53, the up software key 1221 or the down software key 1222 or the ten-keys (numeral input keys) 123 are used to change the operand to the required value and the routine proceeds to step 44.

The processing in the other steps is the same as in the flow chart of FIG. 7.

In the above explanation, the robot control apparatus of the present invention does not require a keyboard having full ASCII keys, and the explanation was given with regard to a teach pendant 12 in an actual usage, but it is possible to use an input panel provided in the box unit 11 and having full keys and perform a similar operation key. Further, the selection of the language to be changed and other operations can be made by hardware keys instead of software keys.

We claim:

1. A robot control apparatus which controls a robot by a program in machine language, characterized in that said robot control apparatus comprises:
   - a control panel having keys and a display for displaying at least one block of data in word language corresponding to GS codes but definitive of a desired robot movement to an intended user of the robot;
   - a program in said word language for displaying on said display;
   - means for moving a cursor to a position on said display displaying a block of data in said word language for selecting a word in said displayed word language to be changed;
   - key means for cyclically selecting a replacement word for said selected word and replacing said selected word at said selected position with said replacement word;
   - repeating said moving said cursor, selecting a word to be changed, selecting a replacement word and replacing the selected word with the replacement word until a desired block of said word language words are compiled and displayed on said display; and
   - key means for storing said desired block of words in said desired compiled block.

2. An apparatus according to claim 1, wherein said keys for cyclically selecting a required word include an up software key and a down software key.

3. An apparatus according to claim 1, wherein said word displayed at said selected position is selected by an operation previous to a prior operation, and is preferentially indicated on said display.

4. An apparatus according to claim 3, wherein said word displayed at said selected position is selected first by a highest frequency of selection in prior selection, operations previous to the prior operation, and is preferentially indicated on said display.

5. An apparatus according to claim 3, wherein said word displayed at said selected position is selected before the selection operation previous to the prior operation, and is preferentially indicated on said display.

6. An apparatus according to claim 1, wherein said word includes operands and said apparatus comprises a means for moving a cursor to a position for a change of an operand to be changed among said operands, and a means for changing said operand at said position of change.

7. An apparatus according to claim 6, wherein said means for changing the operand changes and cyclically selects a required operand.

8. An apparatus according to claim 7, wherein said means for changing the operand cyclically selects a required operand by using said up software key and said down software key.

9. An apparatus according to claim 6, wherein said means for changing the operand changes a required operand directly by using a predetermined reference corresponding to said required operand.

10. An apparatus according to claim 6, wherein said operand displayed at said operand changing position is selected by an operation previous to the prior operation, and is preferentially indicated on said display.

11. An apparatus according to claim 10, wherein said operand displayed at said operand changing position is selected first by the highest frequency of selection in prior selection operations, and is preferentially indicated on said display.

12. An apparatus according to claim 10, wherein said operand displayed at said operand changing position is selected before the selection operation previous to the prior operation, and is preferentially indicated on said display.

* * * * *